Figure 1:
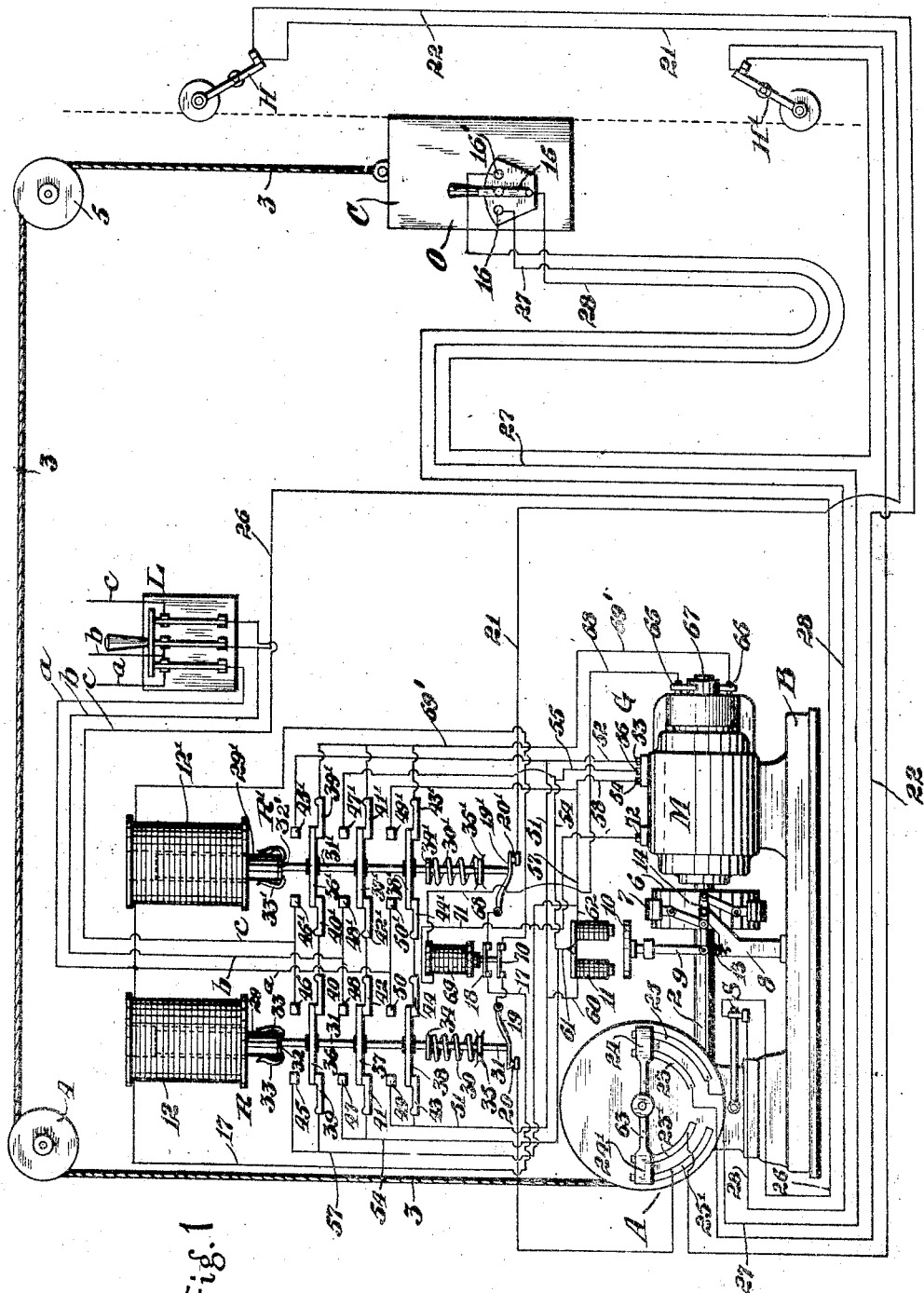

W. N. DICKINSON, Jr.
ELECTRODYNAMIC BRAKE FOR ALTERNATING CURRENT MOTORS.
APPLICATION FILED DEC. 20, 1905.

1,002,233.

Patented Sept. 5, 1911.

3 SHEETS—SHEET 1.

Witnesses
S. Herzog
Walter Strang

Inventor
William N. Dickinson, Jr.
By Chas. M. Nissen
Attorney

W. N. DICKINSON, Jr.
ELECTRODYNAMIC BRAKE FOR ALTERNATING CURRENT MOTORS.
APPLICATION FILED DEC. 20, 1905.
1,002,233.
Patented Sept. 5, 1911.
3 SHEETS—SHEET 2.
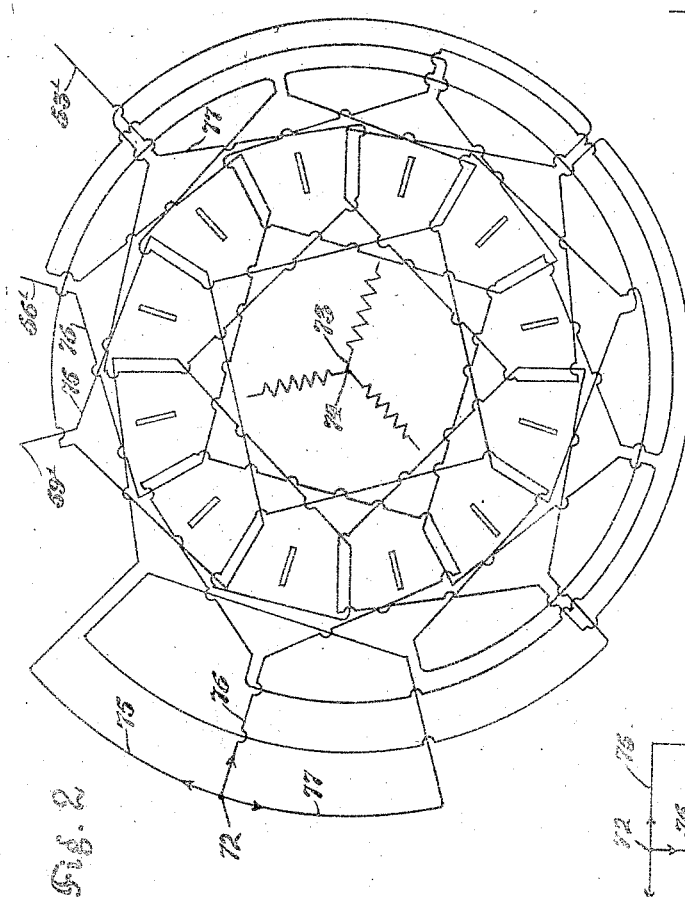
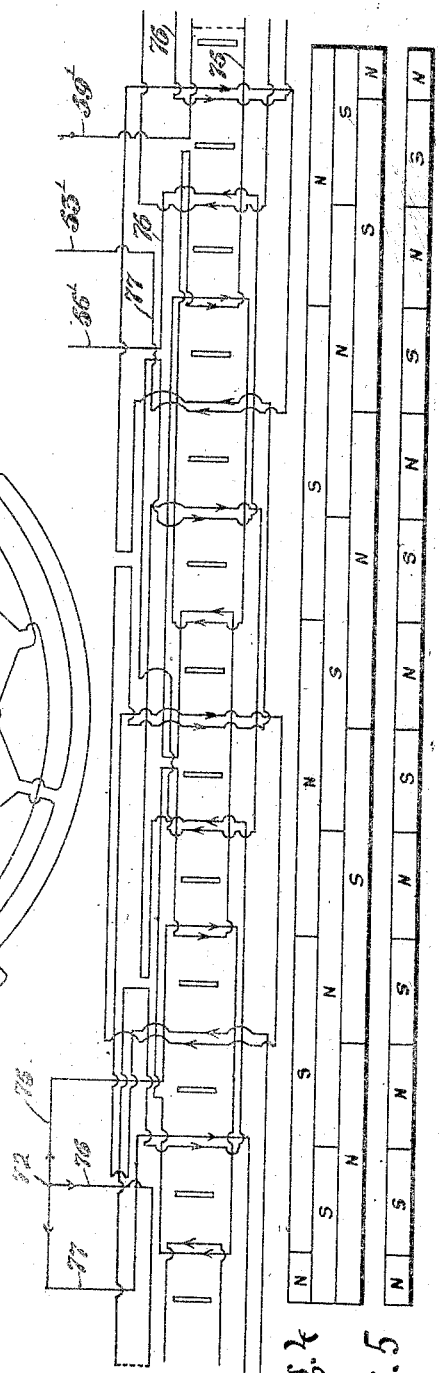

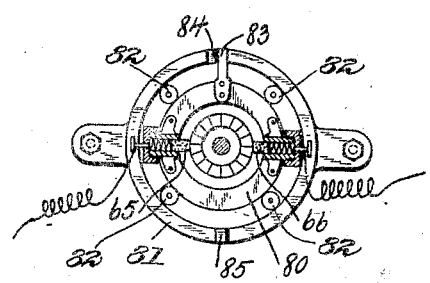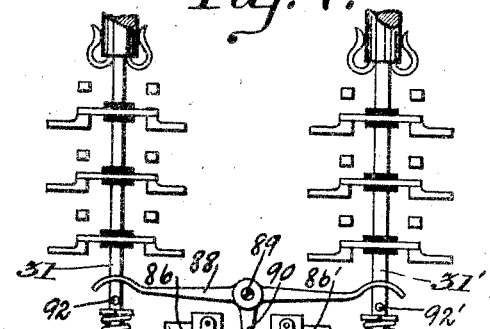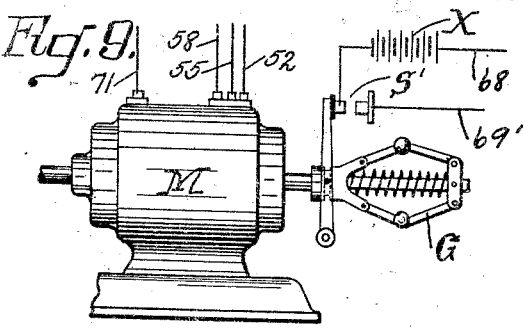

UNITED STATES PATENT OFFICE.

WILLIAM N. DICKINSON, JR., OF BROOKLYN, NEW YORK, ASSIGNOR TO OTIS ELEVATOR COMPANY, OF JERSEY CITY, NEW JERSEY, A CORPORATION OF NEW JERSEY.

ELECTRODYNAMIC BRAKE FOR ALTERNATING-CURRENT MOTORS.

1,002,233.

Specification of Letters Patent.

Patented Sept. 5, 1911.

Application filed December 20, 1905. Serial No. 252,541.

*To all whom it may concern:*

Be it known that I, WILLIAM N. DICKINSON, Jr., a citizen of the United States, residing at Brooklyn, in the county of Kings and State of New York, have invented a new and useful Improvement in Electrodynamic Brakes for Alternating - Current Motors, of which the following is a specification.

My invention relates to means for controlling alternating current electric motors and is herein shown applied to an electric elevator system, but is applicable to general use.

One of the objects of my invention is the provision of simple and efficient means for stopping an alternating current motor.

A further object of the present invention is to provide an improved electric elevator system.

Other objects of the invention will appear hereinafter, the novel combinations of elements being pointed out in the claims.

In the accompanying drawings, Figure 1 represents diagrammatically my invention applied to an electric elevator system; Fig. 2 represents the preferred form of stator winding for the alternating-current motor which is herein shown as of the induction type; Fig. 3 represents a development of such windings; Fig. 4 shows the effects of the different windings as to polarity at a given instant; Fig. 5 shows the resultant poles due to the current when flowing as indicated in Fig. 3; Fig. 6 is a detail view of means for automatically shifting the position of the generator brushes when the direction of the rotation of the motor is reversed; Fig. 7 is a view of means for reversing connections between the armature and field windings of the generator when the motor is reversed; Fig. 8 shows a modified construction for reversing the connections; Fig. 9 shows a modified arrangement for controlling the supply of current to the field windings from an external source.

One of the chief difficulties heretofore encountered in connection with the operation of electric elevators by alternating current induction motors, has been that no dynamic braking effect could be accomplished in bringing the motor to rest. As the rotor of the ordinary commercial A. C. motor is normally heavy and of high peripheral speed, this lack of dynamic braking effect has placed an excessive duty on the mechanical braking device and has thus limited the size and speed of the motor which could be brought to rest within the limiting conditions of satisfactory electric elevator service and has in consequence limited the speed of elevator cars operated by induction motors. The invention which I am about to describe has for its object the overcoming of this difficulty by the use of a direct-current generator driven by the motor and of proper connections for applying the direct current so generated to the stator windings of an alternating-current elevator motor, so as to produce fixed poles by means of the stator windings or separate and independent windings, which when completing their magnetic circuit through the short-circuited or partially short-circuited rotor, will produce in the latter the dynamic braking effect desired.

In explanation of the above, it may be said that it is a well-known fact that if short-circuited coils wound on a magnetic conductor are rotated in a fixed magnetic field, local circuits will be induced in the coils, whose effect is to retard the mechanical rotation. As the rotor windings of an induction motor are always short-circuited or partially short-circuited, it remains simply to supply the direct current and properly connect it at the right moment to coils which will produce the magnetic field, in order to accomplish the retarding effect, and it is designed that the total short-circuiting or the partial short-circuiting of the rotor coils shall be arranged definitely, or made adjustable, in order to produce the best results under different conditions in connection with this system. It will be observed that the generator should preferably have a field which will retain considerable residual magnetism, in order that its field may charge promptly on the starting up of the machine. If desired, these fields could be made of permanent magnets, but under ordinary conditions this would not be necessary. It is further apparent that a direct-current generator need be of but comparatively small size as compared with the alternating-current motor, as its function is simply to provide a field with fixed poles in the alternating current motor, and the amount of energy required would approximate that called for by the shunt field of a direct current motor of a size similar to that of the alternator; and further, as this direct current is required only for short periods at the time of stopping, its heating effect on the direct-current generator is but occasional in occurrence and but of short duration. Emphasis is laid on this point, in order that it may be clear that the additional expense of this direct current attachment is not great and that the added momentum of its rotary member, which must also be overcome in bringing the main motor to rest, is small. Further, the load of the generator, when producing current assists in stopping the alternating current motor. The direct-current generator could be wound either shunt, series or compound, but either the latter or the former would be preferable, and the voltage for which it would be wound would normally be much lower than the initial voltage on the alternating current motor, owing to the low ohmic resistance of the stator windings of the alternating current motor. As the direct current is on the stator winding of the alternating current motor only during the brief period required to bring its rotor to rest, after the alternating current has been cut off from the stator windings, it is evident that a much larger current may be passed through the stator windings from the direct-current generator than from the alternating current source of supply, without overheating these windings, and under certain conditions it might prove desirable to take advantage of this fact.

Referring to Fig. 1, it will be seen that an induction motor M is mounted at one end of a bed-plate B while at the other end is secured the hoisting apparatus A which comprises the usual drum for winding and unwinding the hoisting cable 3. The cable 3 is here shown passing over the sheaves 4 and 5 to the car C. The motor shaft 2 is suitably connected to the hoisting apparatus to effect the actuation of the same when the motor M is operated. The type of alternating-current motor M may be varied as desired but I employ for illustration an induction motor having polyphase stator windings and a squirrel cage rotor.

If a single-phase motor is employed, a suitable starting device may be used comprising resistance in circuit with the rotor windings which would be automatically and gradually cut out and the rotor windings finally short-circuited when the motor attained nearly full speed.

6 designates a brake pulley to which is adapted to be applied a suitable brake such as that indicated at 7, for example. A standard 8 may support the brake and also the brake-applying means comprising the brake lever 14 and spring 13. The brake-releasing means comprises a rod 9 connected to the brake lever 14 and an armature 10 together with the brake-magnet 11. The brake mechanism and the means for releasing the same may be of any approved construction, that here shown being merely by way of illustration. So also, the brake magnet which is to be operated by alternating current may be of any suitable mechanical and electrical construction. Also a brake mechanism entirely mechanical may be used.

R, R' designate the reversing switches; L, the main line switch; O, the car switch; H, H', the hatch limit switches; S, the slack cable switch; and G, a direct-current generator mounted on the motor shaft 2. Although the generator G is herein shown direct-connected to the induction motor M the same may be connected to be driven by said motor by other means as by a belt or gearing. When one of the reversing switches is operated the circuit for the generator is broken so that while the induction motor operates the armature of the generator is not connected to the motor windings. As before stated the generator need be of but small size and may be shunt, series or compound wound. What is desired is a source of direct current, controlled by the alternating current motor which direct current is to pass through one or more windings of the alternating current motor to effect an electro-dynamic braking action therein.

When the main line switch L is closed and the car switch O is operated to one of its circuit-closing positions one of the reversing switches will be closed to start the motor M and consequently the car C up or down as desired. If the lever 15 is moved onto the contact 16 a single-phase circuit is established from one of the mains to another. In this instance the circuit may be traced from the main $a$ through coil 12 of reversing switch R, and thence by way of wire 17 to and through switch 18, spring 19', contacts 20', wire 21, upper limit switch H, wire 22, contact-strip 23 of the hoisting drum stop-motion switch, bridge piece 24, contact strip 25, wire 27, contact 16, lever 15, wire 28, slack cable switch S, wire 26, to main $b$. The coil or solenoid 12 will thereupon be excited to lift its core or plunger 29 and permit the spring 30 to close the reversing switch R.

The plungers 29, 29' may be rigidly connected with the vertical bridge-piece carrying rods 31, 31', respectively, so that the latter may be positively actuated to effect the closure of the reversing switches R, R'. Preferably, however, I arrange the plungers 29, 29' independently movable by allowing them to rest normally on the small disks 32, 32' at the upper ends of the rods 31, 31', respectively. Fastened to the under sides of the disks 32, 32' are springs 33, 33' which extend upwardly and engage the lower portion of the plungers 29, 29'. These springs may be omitted if desired but by their use the plungers are centered on the disks and furthermore their frictional engagement with the plungers may be adjusted so that when the plungers are drawn upwardly the rods 31, 31' will be positively actuated to some extent.

Normally the weight of the plungers 29, 29' compresses the springs 30, 30' and forces the bridge pieces carried by the rods 31, 31' into engagement with their lower sets of contacts. For instance, the plunger 29 compresses the spring 30 until the bridge pieces 36, 37 and 38 respectively connect the contacts 39 and 40, 41 and 42, and 43 and 44. It should be noted that the bridge pieces are insulated from the rods carrying them. When the bridge pieces are in their lower positions, the upper portion of the spring 30 is engaged by the cross-piece 34 fixed to the rod 31 while the lower portion of the spring rests on the projection 35 which extends from the controller board for carrying the reversing switches in a well-known manner.

When one of the solenoids 12 or 12' is excited with single-phase current, as explained, the rod 31 or 31' is released and its spring 30 or 30' forces the bridge pieces carried by the rods to engage their upper sets of contacts. When the plunger 29 is lifted the bridge pieces 36, 37 and 38 will disconnect the lower sets of contacts and respectively connect the contacts 45 and 46, 47 and 48, and 49 and 50. It should be noted that the especial purpose of having the reversing switches closed by some resilient means as springs when the magnets are energized, is to avoid any chattering noise or objectionable electrical effects due to uncertain or intermittent contacts caused by alternations of current in the solenoids 12, 12'. In the apparatus as shown, the plungers may have considerable vibration without affecting to any injurious extent the firm engagement of the bridge pieces with their upper sets of contacts. Other means than that here shown may be employed for preventing chattering noises and infirm contacts, and consequent loss of efficiency, as for example, those shown in my co-pending application Serial No. 283,938, filed October 23, 1905, wherein this feature of the apparatus is claimed.

Assuming again that the reversing switch R has been operated by moving the switch lever 15 in the car to its left-hand position and the coil is consequently excited, the bridge pieces 36, 37 and 38 will engage their upper sets of contacts and thus close the circuits to the induction motor M which is shown in this instance as a three-phase induction motor. One phase leads from the main $a$ through contact 50, bridge piece 38, contact 49, wires 51 and 52, to terminal 53; another phase extends from main $b$ through contacts 48 and 47, bridge piece 37, wires 54 and 55, to motor terminal 56; and the third phase may be traced from main $c$ through contact 46, bridge piece 36, contact 45, wires 57 and 58, to motor terminal 59. When the reversing switch R' is operated it will be seen that the connections between the mains $a$ and $c$ and the motor terminals 53 and 59 are reversed, thus reversing the direction of rotation of the electric field in the stator windings and consequently the direction of rotation of the hoisting motor M.

At the same time that the motor circuits are closed to operate the same in one direction or the other, the circuits to the brake-magnet 11 are also closed, the said brake-magnet being connected in parallel with the stator of the motor M. For instance, when the switch R is closed the brake-magnet is energized by current flowing from the main $a$ through wire 60 and from main $c$ through wire 62, the current then passing by way of wire 61 to main $b$.

The brake magnet being energized will operate to release the brake mechanism and allow the motor M to operate the hoisting apparatus to raise the car. The car may have a drum counterweight but this is not shown since it is a well-known arrangement. As the motor approaches the upper limit of its movement in the elevator well, a traveling nut on a screw-threaded extension of the drum shaft actuates the switch arm 63 to disconnect the wiper 24 from the contact strips 23 and 25. If the car should continue farther in its travel the limit switch H would be opened also. In either case the current through the solenoid 12 would be interrupted and the switch R opened. By moving the lever 15 onto the contact 16' the solenoid 12' may be excited to effect the closure of the switch R'. Although the drum stop-motion switch holds the circuit to coil 12 open at this time a circuit through the coil 12' may be closed by moving the car switch O to its opposite position, the lower limit switch H' and the switch comprising the wiper 24' and strips 23', 25' being closed.

As a safeguard against both reversing switches being operated at the same time and thus short-circuiting the mains, I provide switches 20 and 20' in circuit respectively with the coils 12' and 12. If the plunger 29 is lifted, the rod 31 will also be lifted and the spring 19 will act to open the circuit to the coil 12' at the switch 20. It is therefore evident that the reversing switch R would have to be restored to normal before the solenoid 12' could be energized. The switch 20' which co-acts with the switch R' will have the same effect on the coil 12.

It will now be explained how the hoisting motor may be slowed down or stopped by means of my improved electrodynamic brake.

When the reversing switch last operated is restored to normal position, as for example, by moving the switch O in the car to central position, the mains a, b, c, are disconnected from the motor and the brake magnet. The mechanical brake will now go on to stop the motor M and therefore the hoisting apparatus and the car. It has been difficult heretofore to stop alternating-current elevator motors quickly and without any sudden shocks or jars, since the rotor of the ordinary commercial A. C. motor is usually heavy and has considerable momentum stored up in the same when rotated at high speed. In the absence of additional means for braking the motor an excessive duty is placed on the mechanical braking device. This, as before stated, limits the size and speed of a motor which could be retarded and stopped within limiting conditions of satisfactory electric elevator service and consequently limits the speed of elevator cars operated by induction motors. I overcome these difficulties by the application of the direct-current generator G with suitable circuits and connections, to the motor M. This generator may have permanent poles or have its fields separately excited or said generator may be a regular shunt, series, or a compound wound generator.

While the motor is running by momentum, the direct-current generator G operates to send current through a separate or independent winding, or through one or more or all of the stator windings to effect a braking action on the motor in proportion to the speed thereof to slow down or stop the same substantially coincident with the application of the mechanical brake 7, or before or after such application, depending upon the strength and relative retarding effect of the latter, or the dynamic braking principle may be employed independently of other braking action of any nature.

It will be seen that when the reversing switches are both in their lowermost positions a circuit is completed from the direct-current generator armature 67 through brush 65, wire 68, magnet 69, wire 71, to motor terminal 72 and thence through one or more of the stator windings to motor terminals 54, 56 and 53; here the circuits divide and pass in parallel through the lower sets of contacts of the reversing switches and the bridging pieces connecting the same from left to right to the lead 69' which is connected to the other generator brush 66. It is therefore evident that when the reversing switch magnets are deënergized and the rotor of the motor M still rotates the generator G will send a direct current through the stator windings to produce fixed poles in the motor M. The short-circuited or partially short-circuited rotor will then cut the lines of force sent out from poles of one sign to poles of another sign. The current thus set up in the rotor will cause the latter to be retarded and finally stopped by the action of the fixed poles. In other words, the fixed poles will produce in the rotor the dynamic braking effect as desired.

By reference to Figs. 2 and 3, it will be seen that the stator windings in this instance are star-connected. Any other suitable form of winding may be used, however. If it be assumed that the terminal 72 is connected to the common point 74 and the direct current sent in the direction indicated by the arrows in Fig. 2, or as heretofore traced on Fig. 1, the resultant fixed poles may be depicted as indicated in Figs. 3, 4, and 5. Irrespective of the direction of current, the desired electro-dynamic braking action is secured provided alternate fixed north and south poles are obtained.

When the generator G is self-exciting whether the same be shunt, series or compound wound, it is necessary to employ some means to insure the current always flowing in the same direction through the field windings irrespective of the direction in which the generator is rotated, as the generator would not build up if the field current were reversed. This result may be secured in various ways, as, per example, by providing means for automatically shifting the brushes through 180 degrees whenever the generator is reversed, or by reversing the field connections when the generator is reversed. If the brushes of the generator are arranged to change their position approximately 180° when the direction of the rotor is reversed, the current will always pass in the same direction whether the fields of the generator consist of permanent magnets, of separately excited electro-magnets, or of self excited electro-magnets. This change in the position of the brushes may be readily accomplished by means of the construction disclosed in Fig. 6. As here shown the commutator brushes 65 and 66 are carried by a ring 80 rotatable within a stationary ring 81. Antifriction rollers 82 are interposed between the rings 80 and 81. When the motor is rotated in one direction the friction between the brushes and commutator serves to rotate the ring 80 until an arm 83 carried thereby engages a stop 84. When the motor is reversed the brushes are carried with it through 180 degrees and the arm 83 carried against the stop 85. The position of the brushes is thus reversed with each reversal of the motor. This reversal of the position of the brushes could also be accomplished by any other friction or cam method, or other mechanical arrangement. It will also be clear that instead of reversing the position of the brushes when the direction of rotation is reversed, the brushes may be left in a permanent position and the connections between the armature and field windings may be changed. Fig. 7 illustrates a convenient method of accomplishing this result. As here shown, a small reversing switch is provided, which comprises parallel switch arms 86 and 86' connected by a link 87. A lever 88 pivoted at 89 is provided with an arm 90 having a bifurcated end straddling pin 91 on the link 87. The oppositely extending arms of the lever 88 are located in the paths of movement of pins 92 and 92' carried by the rods 81 and 81' connected to the cores of the reversing switch magnets 12 and 12'. The armature brush 65 is connected by the conductor 65ª to the stationary contact 94, and the brush 66 is connected by the conductor 66ª to the stationary contacts 93 and 95. When the reversing switch R is operated the pin 92 engages the lever and moves the switch arms 86 and 86' into engagement with the contacts 92 and 94 respectively, thereby connecting the brushes 65 and 66 to the conductors 69' and 68 respectively; these connections remain unchanged when the reversing switch R is opened. If the reversing switch R' is operated, the switch arms 86 and 86' are moved to the right into engagement with the contacts 94 and 95 respectively, thereby connecting the brushes 65 and 66 to the conductors 68 and 69' respectively. It will thus be seen that whenever the direction of the motor is reversed through the operation of the reversing switches R and R', the connections between the armature of the generator and field windings are reversed. A shunt field winding 96 may be provided as before noted, if desired.

With the arrangement shown in Fig. 7, current from the generator through the field windings is always in the same direction.

Fig. 8 shows still another arrangement for insuring the proper direction of current through the field windings. An auxiliary reversing switch operated by a lever 88 is provided as in Fig. 7, but in the present instance, auxiliary electro-magnets are provided for operating the lever 88. These magnets may comprise coils B and B' in series with the reversing switch magnets 12 and 12' respectively. When the reversing switch magnet 12 is excited to operate the reversing switch R, the magnet coil B draws its core upward and the pin 92 carried thereby moves the switch levers 86 and 86' to the right. When the magnet 12' is excited, the coil B' operates to lift its core and swing the switch arms 86 and 86' to the right to reverse the connections of the generator. In conjunction with the magnets B and B', small holding magnets may be provided if desired. As here shown these holding magnets comprise coils C and C' connected to receive current from the generator, and cores K and K' adapted to be held in the coils C and C' respectively; the object of these direct current holding magnets is to insure the auxiliary reversing switch being held in effective position during the period in which the car switch is opened and the motor armature is being brought to rest or nearly so. Although the magnet coils C and C' are connected in parallel so that they both receive current at the same time, they are so positioned with respect to the cores K and K' that the holding power of each coil is only exerted when its core has been moved upward. It will be understood that these direct current holding magnets may also be employed, if desired, when the switch S is operated by the main reversing switch shown in Fig. 7.

Fig. 9 shows an arrangement for controlling an external source of direct current supply for exciting the field windings. In this instance the centrifugal governor G is carried by the shaft of the motor. When the motor is running, this governor closes a switch S', thereby connecting a battery or other source of current to the conductors 68 and 69'. This governor operates to close the switch when the motor reaches a predetermined speed and to open the switch when the motor comes to rest or nearly so.

Fig. 3 shows the poles and windings of the stator developed or rectified in a longitudinal plane. Fig. 4 shows the resultant poles due to each winding; while Fig. 5 shows the resultant poles.

The direct current passing by way of wire 75 produces a south pole S as indicated on the top section of Fig. 4. Continuing next it produces a north pole N and then again a south pole S and so on. A series of fixed poles could thus be procured with one stator winding alone.

The poles produced by the current passing from the point 74 through the winding 76 are illustrated by the central section of Fig. 4. These two windings could be combined to produce resultant poles but such poles might be too far apart, so I preferably connect also the third winding to the direct-current generator to produce resultant poles comparatively close together. The poles produced by the winding 77 are indicated on the lowermost section of Fig. 4.

It should be noted that as soon as the generator G is connected to send current through the stator winding the magnet 69 is also energized and the switches 18 and 70 controlled thereby brought to open position.

These switches 18 and 70 are respectively in series with the solenoids 12 and 12' so that when the magnet 69 is sufficiently energized, neither reversing switch can be closed. This arrangement has the effect of preventing too sudden reversals of the phase relation of the current through the elevator motor, by the operator in the car. So long as the direct-current generator is producing voltage of sufficient magnitude to enable the magnet 69 to hold its switches 18 and 70 open the motor M cannot be reversed. The hoisting apparatus and motor M may thus be brought to a full stop before the current can be reversed through the stator. This may be necessary for the reason that when the current is flowing through the stator after reversal the condition of a stationary transformer with a short-circuited secondary may exist for too long a period and thus allow excessive current to flow through the stator windings.

Obviously various modifications of the details of construction and arrangement of parts may occur to those skilled in the art and be made by them without departing from the spirit and scope of my invention. I desire therefore not to be restricted to the exact construction herein shown and described.

What I claim and desire to have protected by Letters Patent of the United States, is:

1. The combination with a motor, of a source of current supply therefor, an additional source of current supply dependent upon the movement of said motor, and automatic means for electrically connecting said additional source of supply to said motor to reduce the speed of the latter.

2. In motor-controlling apparatus, the combination with a motor, of a generator, mechanical driving connections between the motor and generator, and means in addition to said driving connections for effecting an electro-dynamic braking action on the motor.

3. In motor-controlling apparatus, the combination of a motor, and means operated by said motor to generate a current and send it through a field circuit of the motor and effect an electro-dynamic braking action thereon.

4. In motor-controlling apparatus, the combination with a motor, of motor-controlling means comprising reversing switches, and means operated by said motor and co-acting with said switches to effect an electro-dynamic braking action on said motor.

5. The combination with a motor, of a source of alternating-current supply therefor, a source of direct-current supply dependent upon the movement of said motor, and means for electrically connecting said additional source of supply to said motor to reduce the speed thereof.

6. The combination with a motor, of a source of current supply therefor, an additional source of current supply normally inoperative, means for rendering said additional source operative as soon as the motor supply current is interrupted or sufficiently reduced, and means co-acting with said additional source of supply for reducing the speed of said motor.

7. In motor-controlling apparatus, the combination with a motor, of circuits and connections for a constant potential source of supply, a generator connected to said motor, and means for effecting the operation of said generator, to cause current to be sent therefrom into said motor to reduce the speed of the latter.

8. In motor-controlling apparatus, the combination with an alternating current motor, of a source of current dependent upon said motor, and means for electrically connecting said source of current to said motor to reduce the speed thereof.

9. In motor-controlling apparatus, the combination with an alternating current motor, of a source of current dependent upon said motor, and means for automatically connecting said source of current to said motor to reduce the speed thereof.

10. In motor-controlling apparatus, the combination with an alternating current motor, of reversing switches therefor, a local source of current, and means dependent upon the position of said reversing switches for electrically connecting said source of current to said motor to retard the action thereof.

11. In motor-controlling apparatus, the combination with a motor, of a generator connected thereto, and means for connecting said generator to a winding of said motor to effect an electro-dynamic braking action thereon.

12. In motor-controlling apparatus, the combination with an induction motor, of a generator connected thereto and normally running free, and means for connecting said generator to one or more stator windings to effect an electro-dynamic braking action on the motor.

13. In motor-controlling apparatus, the combination with an induction motor, of a brake therefor, a generator connected to be driven by said motor, and means for connecting said generator to one or more windings of the stator to effect an electro-dynamic braking action on said motor and thus assist the said brake in stopping the motor.

14. In motor-controlling apparatus, the combination with an induction motor, of a direct-current generator connected to be driven by said motor, but normally running free, means for connecting said generator to one or more of the stator windings to produce fixed poles and thus effect a retarding action on the rotor.

15. In motor-controlling apparatus, the combination with an induction motor, of a direct-current generator directly connected therewith, and means for electrically connecting said generator with one or more of the stator windings to produce fixed poles and thus effect a retarding action on the rotor.

16. In motor-controlling apparatus, the combination with a motor, of reversing means therefor, a generator connected to be driven by said motor, an electro-responsive device, and means for connecting said electro-responsive device to said generator to prevent reversal of the phase relation of the current to said motor until the motor stops, or is materially reduced in speed.

17. In motor-controlling apparatus, the combination with an alternating current motor, of a generator driven by said motor, electrical connections between said generator and said motor to cause current to be sent from said generator through one or more primary windings of said motor to reduce the speed thereof, and an electro-responsive device in said connections to prevent too sudden reversal of the phase relation of the current to said motor.

18. In motor-controlling apparatus, the combination with an induction motor, of a direct-current generator driven by said motor, means for automatically connecting said generator with one or more stator circuits to produce fixed poles in said motor, and means for preventing reversal of the phase relation of the operating current supplied to said motor until the motor has stopped, or is materially reduced in speed.

19. In an elevator, the combination with a car and hoisting apparatus, of an alternating-current driving motor, a brake, a direct-current generator, and means for connecting said generator to one or more windings of said motor to effect an electro-dynamic braking action thereon to assist the said first brake in stopping the motor.

20. In an elevator, the combination with a car and hoisting apparatus, of a driving motor, reversing switches, a switch on the car for controlling said reversing switches, a generator, and means operated by said generator to prevent the operation of said reversing switches until the motor has been reduced to a minimum speed.

21. In an elevator, the combination with a car and its hoisting apparatus, of an induction motor for driving said hoisting apparatus, an electro-mechanical brake for said motor, a direct-current generator driven by said motor, and means for connecting said generator to one or more stator windings to effect an electro-dynamic braking action on said motor in proportion to the speed thereof and thus assist the electro-mechanical brake in stopping the motor.

22. In an elevator, the combination with a car, hoisting apparatus and motor; of a direct-current generator connected to be operated by said motor when momentum driven; and means for automatically connecting said generator to one or more motor windings to effect an electro-dynamic braking action thereon.

23. In an elevator, the combination with an electric motor, of reversing switches, a generator connected to be driven by said motor, and means co-acting with said reversing switches for electrically connecting said generator to said motor to reduce the speed of the latter upon the interruption of the electric power supply to the motor.

24. In an elevator, the combination with an electric motor, of reversing switches therefor, a generator connected to said motor, switches co-acting with said reversing switches to electrically connect said generator to said motor.

25. The combination with a motor, of two sources of current supply, both of said sources being connected to the motor one supplying substantially constant potential current to operate the same and the other arranged to retard the speed thereof, and means for controlling the flow of current from said sources of supply.

26. The combination with an alternating current motor, of a source of current supply therefor, means operated by the motor for generating current, and means for reducing the speed of said motor by introducing said current into one or more windings of the motor.

27. The combination with an alternating current motor, of a source of current supply therefor, and means for producing an electro-dynamic braking action within said motor by current generated externally of the motor.

28. The combination with an alternating current motor, of a source of current supply therefor, and a generator arranged to supply current to said motor to effect an electro-dynamic braking action thereon.

29. In a system of motor control, the combination of a motor, reversing mechanism therefor, electric means for actuating the reversing mechanism, and means comprising a generator connected to the motor and an electro-magnetic switch for interrupting the circuit of said electric means to prevent a sudden change in the direction of rotation of the motor-armature.

30. In a system of motor control, the combination of a motor, reversing switches for such motor, an electro-magnet associated with each switch for operating the same, and means comprising a generator connected to the motor set into action by the opening of one of these reversing switches for preventing the immediate energization of the electro-magnet associated with the other switch.

31. In a system of motor control, the combination with a motor, of starting apparatus therefor, a separate source of current dependent upon said motor, and means operated by the current from said separate source for preventing a sudden reversal of the starting apparatus.

32. In a system of motor control, the combination of a motor, reversing switches, an operating circuit for said reversing switches, and means only mechanically connected to the motor-armature for creating a separate source of current, and means operated by the current from said separate source for maintaining the operating circuit open until the motor-armature's speed is substantially reduced.

33. In motor-controlling apparatus, the combination with an alternating current motor, of reversing means therefor, a separate source of electric current dependent upon said motor, and an electro-responsive device operated by the current from said separate source to prevent reversal of the phase relation of the current to said motor until the motor stops or is substantially reduced in speed.

34. In a multiphase system of motor control, in combination, a multiphase motor and a direct current generator mechanically connected to run together, reversing switch mechanism controlling the motor circuits, and means operated by said mechanism for closing the generator circuit when the current supply is cut off from the motor.

In testimony whereof, I have signed my name to this specification in the presence of two subscribing witnesses.

WILLIAM N. DICKINSON, JR.

Witnesses:
    CHAS. M. NISSEN,
    PAUL DE MONTCALM.